United States Patent
Ohana

(10) Patent No.: US 10,803,853 B2
(45) Date of Patent: Oct. 13, 2020

(54) AUDIO TRANSCRIPTION SENTENCE TOKENIZATION SYSTEM AND METHOD

(71) Applicant: OPTUM SERVICES (IRELAND) LIMITED, Dublin (IE)

(72) Inventor: Bruno Ohana, Dublin (IE)

(73) Assignee: OPTUM SERVICES (IRELAND) LIMITED, Dublin (IE)

(*) Notice: Subject to any disclaimer, the term of this patent is extended or adjusted under 35 U.S.C. 154(b) by 258 days.

(21) Appl. No.: 15/971,707

(22) Filed: May 4, 2018

(65) Prior Publication Data

US 2019/0341023 A1   Nov. 7, 2019

(51) Int. Cl.
| | |
|---|---|
| G10L 15/22 | (2006.01) |
| G10L 15/02 | (2006.01) |
| H04M 3/22 | (2006.01) |
| G10L 15/18 | (2013.01) |
| G10L 15/26 | (2006.01) |

(52) U.S. Cl.
CPC .......... *G10L 15/02* (2013.01); *G10L 15/1807* (2013.01); *G10L 15/26* (2013.01); *H04M 3/2218* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 6,869,018 B2* | 3/2005 | Fifield | ................... | G06F 40/169 235/487 |
| 7,668,718 B2* | 2/2010 | Kahn | ................... | G10L 15/063 704/270 |
| 8,731,901 B2* | 5/2014 | Srihari | ................... | G06F 40/53 704/2 |
| 8,788,263 B1* | 7/2014 | Richfield | .............. | G06F 16/951 704/9 |
| 2002/0124018 A1* | 9/2002 | Fifield | ................... | G06F 40/169 715/205 |

(Continued)

*Primary Examiner* — Michael N Opsasnick
(74) *Attorney, Agent, or Firm* — Seyfarth Shaw LLP; Brian L. Michaelis

(57) ABSTRACT

A system and method for tokenizing sentences in transcriptions of electronic communication audio files includes one or more electronic data storage systems coupled in electronic communication with an audio receiver. A collection of audio files is stored in the electronic data storage system(s). The audio receiver is configured to receive one or more audio files from the electronic data storage systems. The system also includes a speech-to-text processing engine configured to transcribe the one or more audio files received by the audio receiver to produce input transcriptions. In addition, the system includes a call tokenization engine that stores a list of candidate expressions and expression pairs that are indicative of turn taking and change of context in phone conversations. The call tokenization engine also receives input transcriptions of the one or more audio files from the speech-to-text processing engine, scans each input transcription for the one or more candidate expressions and expression pairs, inserts a punctuation marker adjacent a detected expression when the detected expression is one of the one or more candidate expressions and expression pairs, and outputs a tokenized transcription when the call tokenization engine reaches an end of the input transcription.

20 Claims, 6 Drawing Sheets

(56) References Cited

U.S. PATENT DOCUMENTS

2006/0149558 A1* 7/2006 Kahn .................... G10L 15/063
　　　　　　　　　　　　　　　　　　　　　　704/278
2006/0253418 A1* 11/2006 Charnock .............. G06Q 10/10
2013/0268260 A1* 10/2013 Lundberg .......... G06F 16/90332
　　　　　　　　　　　　　　　　　　　　　　704/8

* cited by examiner

AUDIO TRANSCRIPTION SENTENCE TOKENIZATION SYSTEM AND METHOD

TECHNICAL FIELD

The present disclosure relates generally to speech information processing and particularly to systems and devices for sentence tokenization in transcription of electronic communications.

BACKGROUND

A large amount of consumer information is routinely collected by service providers, agencies, researchers and other institutions through telephone conversation and call audio. Processing of the information contained within the phone call audio files generally involves producing a text transcript of the audio as input to natural language processing and information extraction methods. Transcripts of audio calls can be obtained using a speech-to-text processing engine.

Sentence tokenization is used in natural language processing to split input text into separate sentences. However, the processing of audio files to produce transcripts does not provide the necessary punctuation marks to clearly delimit sentences as with normal written text. Currently, such punctuation marks may be inferred from a pause or silence present in the audio. However, the inference of these punctuation marks is not always reliable as the inference is dependent on the pace of the speaker in the audio files. In addition, the audio files may also only have one side of the phone conversation available for transcription and the pauses in the audio may have already been removed. Due to these and other difficulties, useful and accurate audio transcriptions with necessary punctuation marks have heretofore been scarce.

SUMMARY

The present disclosure generally provides systems, devices, and methods that solve the technical problems associated with limited capabilities in transcription of telephone call audio files, such as through natural language processing. In particular, according to embodiments of the present disclosure improved communication and audio processing systems, devices, and methods are configured to more reliably tokenize sentences in transcriptions of electronic communication audio. The improved communication and audio processing systems and devices use an improved call tokenization engine to determine the boundaries of sentences and produce transcribed telephone conversations with more accurate sentence tokenization.

A system for tokenizing sentences in transcriptions of electronic communication audio files according to an aspect of the present disclosure includes one or more electronic data storage systems coupled in electronic communication with an audio receiver. A collection of audio files is stored in the electronic data storage system(s). The audio receiver is configured to receive one or more audio files from the electronic data storage systems. The system also includes a speech-to-text processing engine configured to transcribe the one or more audio files received by the audio receiver to produce input transcriptions. In addition, the system includes a call tokenization engine that stores a list of candidate expressions and expression pairs that are indicative of turn taking and change of context in phone conversations. The call tokenization engine also receives input transcriptions of the one or more audio files from the speech-to-text processing engine, scans each input transcription for the one or more candidate expressions and expression pairs, inserts a punctuation marker adjacent a detected expression when the detected expression is one of the one or more candidate expressions and expression pairs, and outputs a tokenized transcription when the call tokenization engine reaches an end of the input transcription.

A method of phone call audio tokenizing according to an aspect of the present disclosure includes receiving one or more electronic communication audio files and transcribing each of the one or more audio files to produce input transcriptions. The method also includes storing one or more candidate expressions and expression pairs that are indicative of turn taking and change of context in phone conversations, receiving the input transcriptions from the speech-to-text processing engine, scanning each input transcription for the one or more candidate expressions and expression pairs, inserting a punctuation marker after a detected expression based on punctuation of the detected expression when the detected expression is one of the one or more candidate expressions and expression pairs, and outputting a tokenized transcription when the call tokenization engine reaches an end of the input transcription.

Additional features and advantages of the present disclosure are described below. It should be appreciated by those skilled in the art that this disclosure may be readily utilized as a basis for modifying or designing other structures, systems and processes for carrying out the same purposes of the present disclosure. It should also be realized by those skilled in the art that such equivalent implementations do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

Embodiments of devices, systems, and methods are illustrated in the figures of the accompanying drawings, which are meant to be exemplary and not limiting, in which references are intended to refer to like or corresponding parts, and in which.

DETAILED DESCRIPTION

The present disclosure gives an organization a call tokenization engine within an optimized, secure network to more accurately determine sentence boundaries in transcription of communication audio. Further, the call tokenization engine may also be implemented in a non-secure network to more accurately determine sentence boundaries in transcription of communication audio. The improved transcription processing, for example of communications between a caller and an organization, enables the organization to better address the callers communication/needs based on granular analysis of the text of the transcription. The more accurate determination of sentence boundaries simplifies and allows for easier granular analysis of transcripts of audio communications, such as caller phone calls, by breaking down the call into meaningful sentences more accurately. The herein disclosed systems and methods provide improvements over present technical environments by using an improved call tokenization engine, as described herein, to more precisely determine sentence boundaries and insert punctuation markers in transcribed communications.

Figure 1:
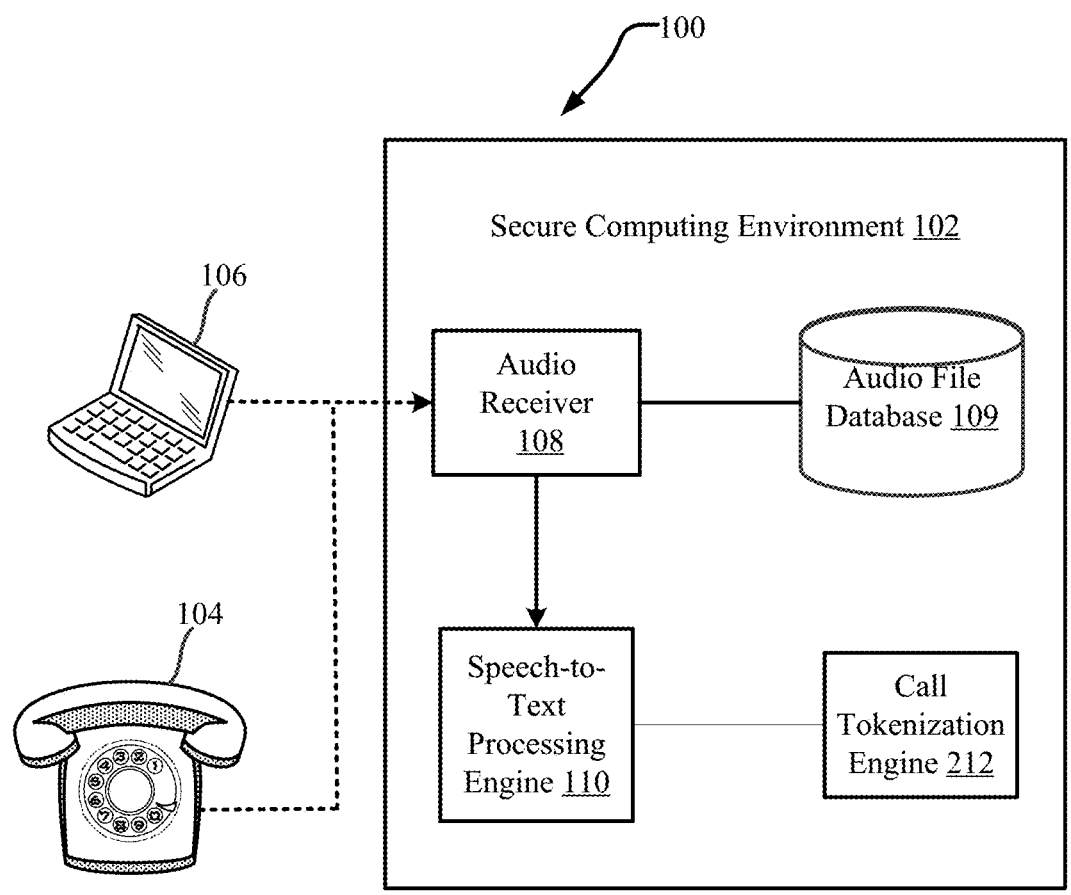
FIG. 1 illustrates an exemplary overview diagram of a system for sentence tokenization in natural language processing of phone calls according to an embodiment of the present disclosure.

Referring to FIG. 1, an overview diagram illustrating a system 100 for tokenizing sentences in transcriptions of telephone call audio files within a network is described. The system 100 accurately determines sentence boundaries and inserts punctuation markers in transcriptions of communications to perform granular data analysis at a sentence level. Better, granular data analysis enables an organization/callee to address a caller's communications/needs more accurately. The system 100 may include a secure computing environment or network 102. Various embodiments described herein involve sensitive and/or personal information. Thus, it should be appreciated that the secure computing environment is not a general purpose computing environment. Rather, the secure computing environment implements specially configured security parameters, and may be part of a highly secure network of multiple secure computing environments.

In the network as described, a caller contacts the system 100 within an organization via a telephone 104 or a computing device 106. The caller's communication may be directed to an audio receiver 108, which receives an audio file of the caller's communication and stores the audio file in an audio file database 109 within the secure computing environment 102. The audio receiver 108 may be an organization call center capable of recording and generating an audio file of the communication of the caller and storing the generated audio file in the audio file database 109. It should be appreciated, however, that the audio receiver 108 may be any of various devices capable of receiving or generating an audio file in accordance with the present disclosure. Further, the audio receiver may generate and store an audio file for each caller communication received by the system 100. In addition, the audio receiver 108 may also generate and store an audio file for the callee's communication with a caller in the audio file database.

Once the one or more audio files are generated and stored, a speech-to-text processing engine 110 is used to select one of the one or more audio files and transcribe the selected audio file. The speech-to-text processing engine generally selects one of the one or more audio files stored in the audio file database and transcribes the selected audio file to produce input transcriptions. It should be appreciated, however, that transcription techniques other than a speech-to-text processor may be implemented in accordance with the present disclosure. The speech-to-text processing engine 110 is in electronic communication with a call tokenization engine 212 that determines boundaries of sentences using certain words and utterances within the transcription of the audio files as proxies for sentence boundaries and inserts a punctuation marker into these determined boundaries, as described in detail hereinafter.

Figure 2:
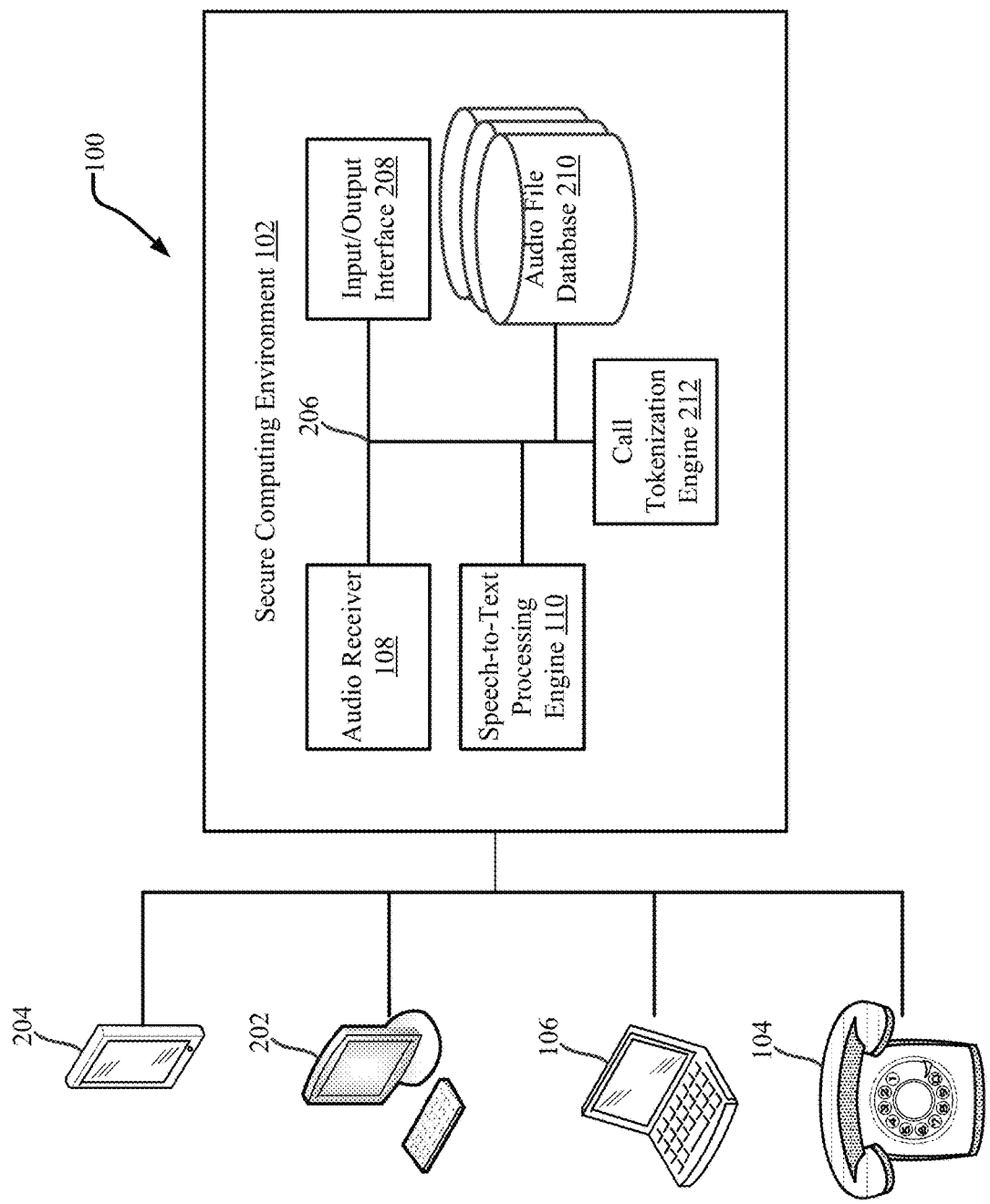
FIG. 2 illustrates a detailed system diagram for sentence tokenization in natural language processing of phone calls according to an embodiment of the present disclosure.

Referring now to FIG. 2, the system 100 of FIG. 1 for tokenizing sentences in transcriptions of audio files, such as telephone call audio files within the secure network, is described in greater detail. The system 100 is generally implemented in the context of a secure computing environment 102. A caller may interact with the secure computing environment 102 using various technologies, e.g., audibly via a telephone 104, a laptop 106, a desktop computer 202, or a smart device 204. Further, the system 100 may also be implemented in a non-secure network. The smart device 204 may be a smart phone, tablet, or other like device that implements software in the form of software applications.

The components of the secure computing environment 102 implementing audio processing and sentence tokenization according to the disclosure may be connected via one or more buss(es) 206. In addition, various components of the secure computing environment 102 may be connected through direct linkages. The secure computing environment 102 includes an input/output interface 208 that enables the secure computing environment 102 to communicate data, control signals, data requests, and other information with other devices including computers, data sources, storage devices, and the like. The input/output interface 208 may communicate via wired or wireless connections. One skilled in the art should appreciate that the secure computing environment 102 may receive audio, image, text, video, and other inputs and transmit data to another computer or other source via the input/output interface 208.

When a caller communicates with the secure computing environment 102, the caller's communication is directed from the input/output interface 208 to the audio receiver 108. The audio receiver 108 receives the caller communication and creates and stores an audio file for the caller communication in an audio file database 210 within the secure network, for example as described herein above with respect to FIG. 1. Further, the audio receiver 108 may also receive and store an audio file for the callee's communication with the caller in the audio file database 210. Some examples of communications that may be received and stored as an audio file are communications regarding a caller's account coverage or a current status of a caller's account. In addition, the communication from the caller may be through a call center of the organization/callee.

The secure computing environment 102 also includes the speech-to-text processing engine 110. The speech-to-text processing engine 110 may select which audio file stored within the audio file database 210 is to be transcribed. In addition, the speech-to-text processing engine produces a transcription of the selected audio file by processing the audio data and transcribing text of the audio data to produce an input transcription. Further, the speech-to-text processing engine produces a transcription for each of the audio files stored within the audio file database 210.

The secure computing environment 102 further includes a call tokenization engine 212, implemented to function as described hereinafter with respect to FIG. 4. The call tokenization engine 212 determines boundaries of sentences using certain words and utterances within the transcription of the audio files as proxies for sentence boundaries and inserts a punctuation marker into these determined boundaries to split the text of the transcriptions into meaningful sentences.

More specifically, the call tokenization engine 212 produces a list of candidate expressions and expression pairs that are indicative of turn taking between the caller and an callee of the organization and a change of context during a verbal communication. Candidate expressions may be expressions that are classified as sentence-end and sentence-start based on where the expressions are expected to be found within a sentence. Sentence-end candidate expressions are expressions from a speaker that are expected to be found at the end of a sentence spoken by the caller or callee. Sentence-start candidate expressions are expressions from a speaker that are expected to be found at the beginning of a sentence spoken by the caller or callee. The candidate expressions are a fixed list of expressions that have been extracted from observation of past communications between callers and callees. The candidate expressions list may be implemented in a data structure such as a table or linked list within a database.

Some exemplary sentence-end expressions are "oh my goodness", "oh my gosh", "uh-huh", "how are you", "no that's okay", and "yeah that's okay". Further, some exemplary sentence-start expression are "well I", "yeah I", "okay thank", "alright thank", "well thank", "yeah well", and "okay I". One skilled in the art would understand such exemplary sentence-end and sentence-start expression are merely illustrative and are non-limiting to other possible expressions that can be included as sentence-end and sentence-start expressions. Further, additional expressions may be categorized as sentence-end and sentence-start expressions as determined from past communications between callers and callees.

Expression pairs may be word pairs generated from a list of word and non-word utterances that indicate a pause in the communication. For example, expression pairs may include, but are not limited to, "okay sure", "uh okay", "oh sure". Further, candidate non-word utterances may also be generated automatically. A base formula for automatically generating the candidate non-word utterances may be shown as:

start character('h' or none)+vowel+suffix+end character('h' or none).

Suffixes for the candidate non-word utterances may also be automatically generated from a pattern of one or more of the following consonants: m, n, r, and h. Should the base formula generate a known word, the known word is discarded from the list of candidate non-word utterances. Using the base formula, the candidate non-word utterances can generate a list of expressions that generally indicate a pause during communications. The list of candidate expressions and expression pairs may be used to indicate a location of a beginning or an end of a sentence within the transcription of audio files.

Once the call tokenization engine 212 produces and stores the list of candidate expressions and expression pairs, the call tokenization engine 212 receives input transcriptions of the one or more audio files from the speech-to-text processing engine. The call tokenization engine 212 receives one input transcription at a time for sentence tokenization. However, the call tokenization engine 212 can tokenize input transcriptions in parallel, in other words multiple input transcriptions substantially simultaneously.

After at least one of the input transcriptions for each audio file is received, the call tokenization engine 212 may scan the input transcription for the one or more candidate expressions and expression pairs. The presence of one of the candidate expression and/or expression pairs can be treated as a proxy for a sentence boundary when no additional features can be used to determine sentence boundaries. In other words, based on the presence of one of the candidate expression and/or expression pairs, the call tokenization engine 212 may determine a location for the beginning or end of a sentence.

When it is determined that one of the candidate expression and/or expression pairs is present, the call tokenization engine 212 may insert a punctuation marker adjacent a detected expression in accordance with the detected expression when the detected expression is one of the one or more candidate expressions and expression pairs to tokenize, or separate sentences within the transcriptions. When it is determined that the detected expression is a candidate sentence-end expression, the call tokenization engine 212 may insert a punctuation marker after the candidate expression. Alternatively, when it is determined that the detected expression is a candidate sentence-start expression, the call tokenization engine 212 may insert a punctuation marker before the detected expression.

Once the punctuation marker is inserted, the call tokenization engine 212 resumes scanning the text of the input transcription for additional candidate expressions and/or expression pairs. When the call tokenization engine 212 detects another candidate expression and/or expression pairs, the call tokenization engine 212 inserts another punctuation marker in the manner described above. The call tokenization engine 212 continues to scan the input transcription until the call tokenization engine 212 reaches an end of the transcription. When the call tokenization engine 212 reaches the end of the input transcription, the call tokenization engine 212 outputs a tokenized transcription where the sentences in the transcription are more accurately separated by appropriate punctuation as a function of the candidate expressions and expression pairs to tokenize.

Figure 3:
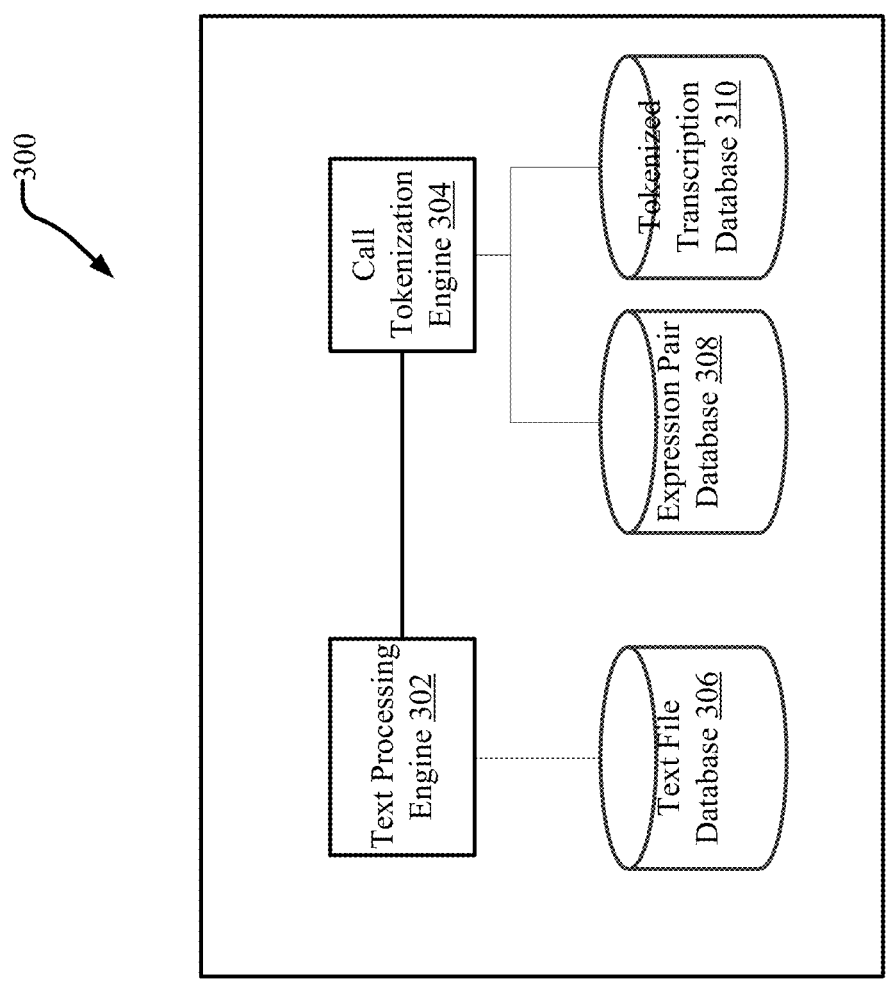
FIG. 3 illustrates an exemplary overview diagram of a device for communication audio transcription sentence tokenization according to an embodiment of the present disclosure.

Referring now to FIG. 3, an overview diagram illustrating a device 300 for communication audio transcription sentence tokenization is described. The device 300 accurately determines sentence boundaries and inserts punctuation markers in transcriptions of communications with callers to perform data analysis at a sentence level and address a caller's communication more accurately. The device 300 includes a text processing engine 302. The text processing engine 302 may receive input transcriptions of electronic communication audio files. The input transcriptions may be generated using a speech-to-text processing engine, similar to the speech-to-text processing engine 110 as explained above. The text processing engine 302 may have an associated data store 306, for example for storing the received input transcriptions of electronic communication audio files, i.e. raw audio speech-to-text processed text files of untokenized text.

The device 300 further includes a call tokenization engine 304. The call tokenization engine 304, similar to the call tokenization engine 212, determines boundaries of sentences using certain words and utterances within the transcription of the audio files as proxies for sentence boundaries and inserts a punctuation marker into these determined boundaries to split the text of the transcriptions into meaningful sentences. The call tokenization engine 304 functions similarly to the call tokenization engine 212, as described above. The call tokenization engine 304 may have an associated expression pair data store 308, for example storing the one or more candidate expressions and expression pairs to use for tokenization. The call tokenization engine 304 may have an associated tokenized transcription data store 310, for example storing the text processed by the call tokenization engine 304 and stored in sentence form with appropriate punctuation. One skilled in the art should appreciate that the data stores 306, 308, 310, could be one data store segmented for storage of the pertinent data as described, or as illustrated it could be a plurality of dedicated data stores.

Figure 4:
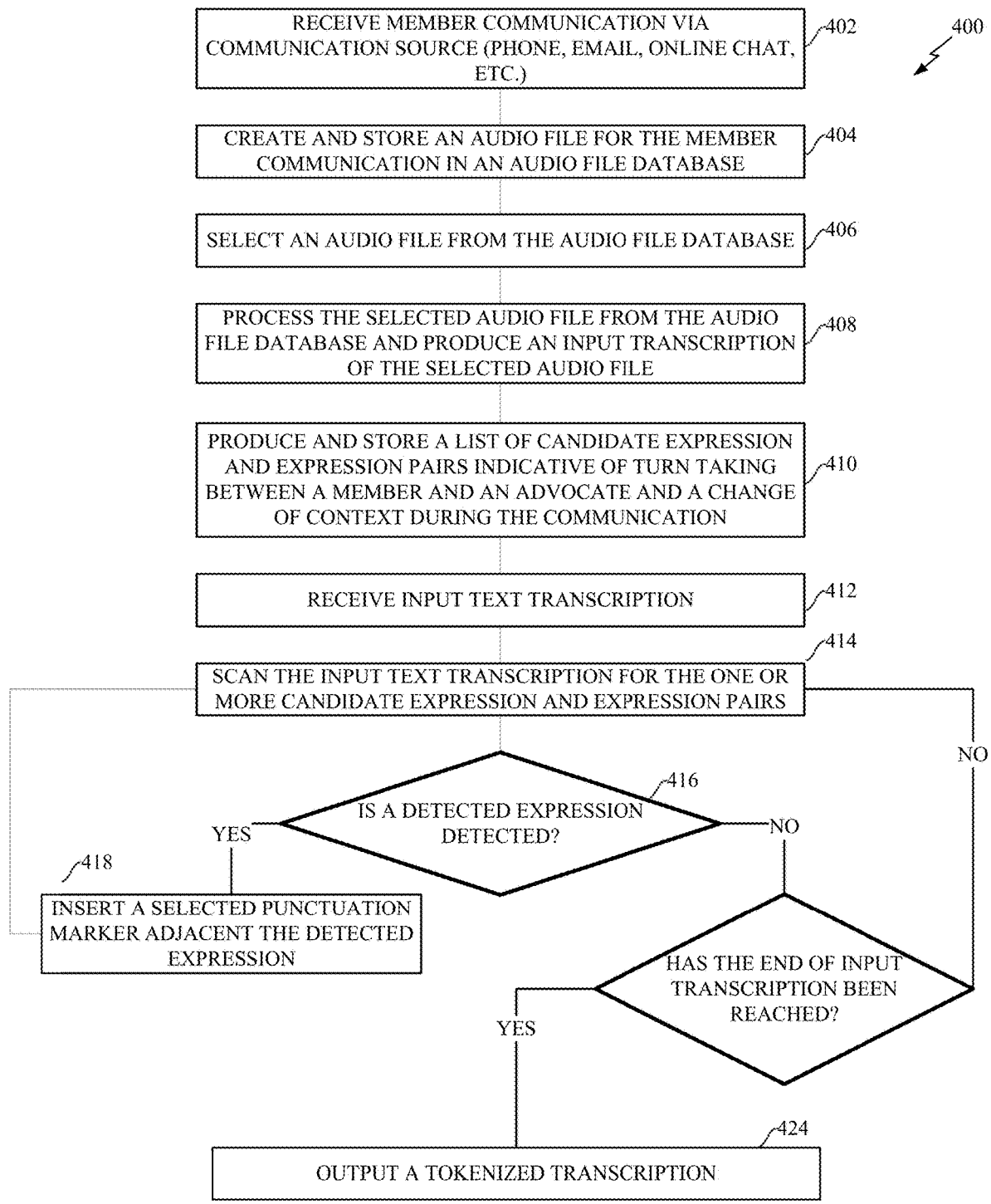
FIG. 4 illustrates a flow diagram of an overview of a method for sentence tokenization in natural language processing of phone calls according to an embodiment of the present disclosure.

Referring now to FIG. 4, a method 400 for tokenizing sentences implementing the system of FIG. 2 is described in greater detail. The system receives a caller communication from the caller's communication source, e.g., telephone, computer, or smart device through the audio receiver, with a(n) organization/callee, illustrated as block 402. The audio receiver then creates and stores an audio file for the caller communication in an audio file database within the secure network, illustrated as block 404. Alternatively, the audio receiver may also receive and store an audio file for the callee's communication with the caller in the audio file database.

After the audio receiver has created and stored the audio file of the communication in an audio file database, the audio file may be selected for speech-to-text processing by a speech-to-text processing engine, illustrated as block 406. When the audio file is selected, the speech-to-text processing engine processes the selected audio file and produces an input transcription of the selected audio file, illustrated as block 408.

Further, a call tokenization engine produces and stores a list of candidate expressions and expression pairs that are indicative of turn taking between the caller and a callee of the organization and a change of context during a communication, illustrated as block 410. The call tokenization engine also receives input text transcription, i.e. raw text, produced by the speech-to-text processing engine, illustrated as block 412.

After the input text transcription is received, the call tokenization engine scans the input transcription for the one or more candidate expressions and expression pairs, illustrated as block 414. While scanning the input transcription for the one or more candidate expressions and expression pairs, the call tokenization engine may or may not detect an expression from the one or more candidate expressions and expression pairs, illustrated as block 416. When/if the call tokenization engine does not detect a detected expression, the call tokenization engine continues scanning the input text transcription. When/if the call tokenization engine detects the detected expression, the call tokenization engine inserts a punctuation marker adjacent a detected expression in accordance with the detected expression when the detected expression is one of the one or more candidate expressions and expression pairs to separate sentences within the input transcription, illustrated as block 418.

Once the punctuation marker is inserted, the call tokenization engine continues to scan the input transcription if the call tokenization engine is not at the end of the input transcription. When the call tokenization engine reaches the end of the input transcription and no additional candidate expressions and expression pairs are detected, the call tokenization engine outputs a tokenized transcription where the sentences in the transcription are more accurately separated, illustrated as block 424. Additionally, the call tokenization engine can substantially simultaneously perform blocks 414-424 for multiple input transcriptions.

Figure 5:
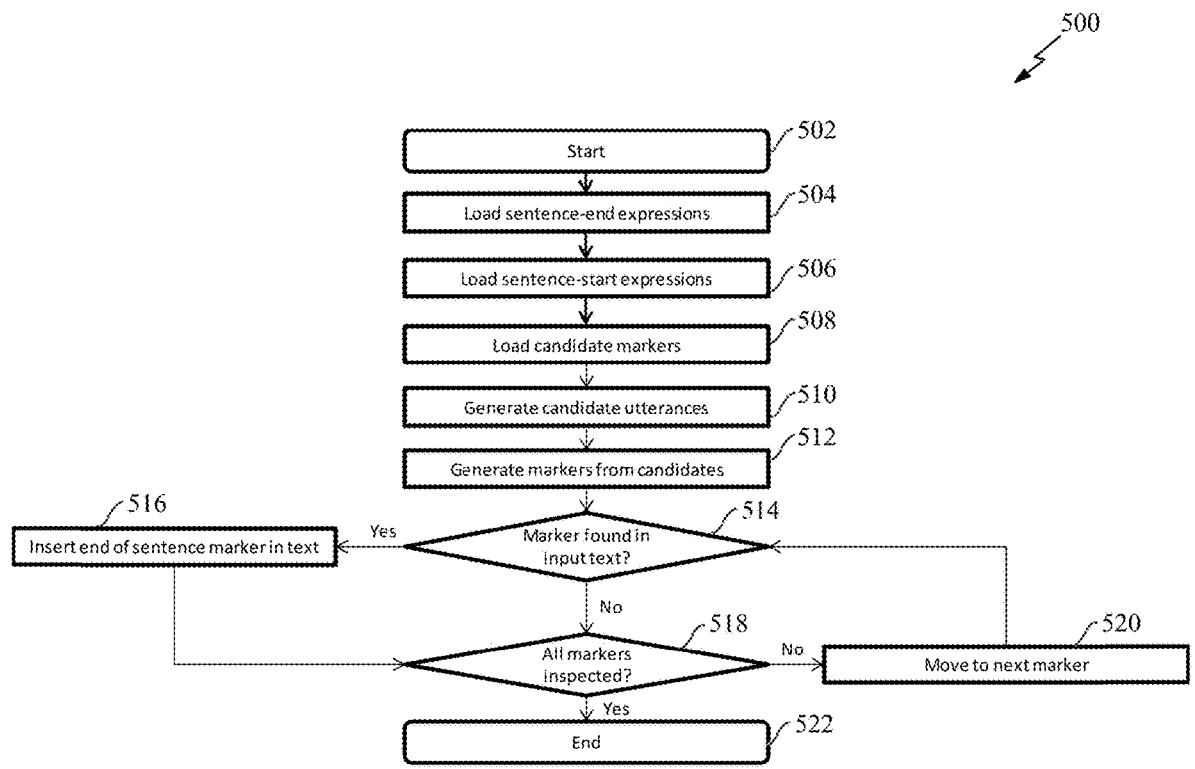
FIG. 5 illustrates an exemplary flow diagram for a sentence tokenizer in natural language processing of phone calls according to an embodiment of the present disclosure.

Referring now to FIG. 5, a method 500 for implementing a sentence tokenizer is illustrated. The method is initiated at block 502. Sentence-end expressions are loaded onto the sentence tokenizer, illustrated as block 504. Sentence-end expressions are expressions from a speaker that are expected to be found at the end of a sentence spoken by the caller, as described above. Once sentence-end expressions are loaded into the sentence tokenizer, sentence-start expressions are loaded into the sentence tokenizer, illustrated as block 506. Sentence-start candidate expressions are expressions from a speaker that are expected to be found at the beginning of a sentence spoken by the caller, as described above. Candidate markers are then also loaded into the sentence tokenizer, illustrated as block 508. Candidate markers are words or non-word utterances that are indicative of pause.

Further, the sentence tokenizer generates candidate utterances, illustrated as block 510. As explained above, candidate utterances are expressions that generally indicate a pause during communications. The sentence tokenizer then generates markers from the candidates, illustrated as block 512. These generated markers may be similar to the expression pairs as described above. The sentence tokenizer then scans the input text for the markers that were previously generated or loaded into the sentence tokenizer, illustrated as block 514. When the sentence tokenizer detects a marker, expression, or utterance, the sentence tokenizer inserts an end of sentence marker in the text, illustrated as block 516. Once an end of sentence marker is inserted into the text or a marker is not found in the text, the sentence tokenizer determines whether all of the markers in the text have been inspected, illustrated as block 518. When the sentence tokenizer determines all of the markers in the text have not been inspected, the sentence tokenizer moves to the next marker in the input text, illustrated as block 520. When the sentence tokenizer determines all of the markers in the input text have been inspected, the sentence tokenizer ends the tokenization of sentences for the input text, illustrated as block 522.

Figure 6:
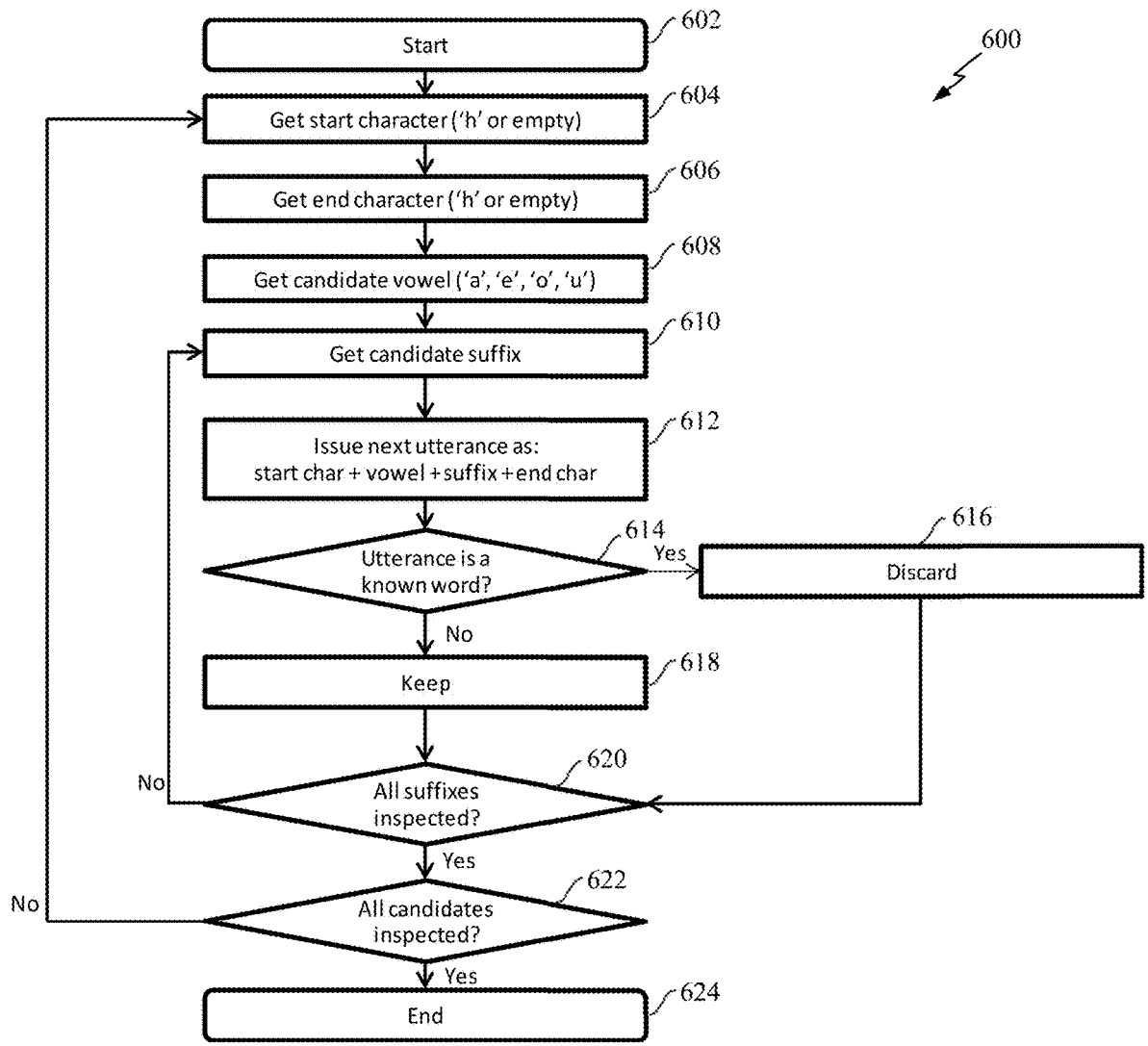
FIG. 6 illustrates an exemplary flow diagram for candidate utterances generation in a sentence tokenizer in natural language processing of phone calls according to an embodiment of the present disclosure.

Referring now to FIG. 6, a method 600 for generation of candidate utterances is illustrated. The method 600 is initiated at block 602. A sentence tokenizer gets a start character for a generated candidate utterance, illustrated as block 604. Generally, the start character for a generated candidate utterance can be an "h" character or an empty character. Once the sentence tokenizer has the start character, the sentence tokenizer gets an end character for a generated utterance, illustrated as block 606. Similar to the start character for a generated utterance, the end character can be an "h" character or an empty character. Candidate vowels are also obtained by the sentence tokenizer, illustrated as block 608. Candidate vowels are vowels used to help build generated utterances in combination with the start character and end character. Exemplary candidate vowels may be an "a" character, an "e" character, an "o" character, and a "u" character. Once the sentence tokenizer has the candidate vowel, the sentence tokenizer gets a candidate suffix for the candidate utterance, illustrated as block 610. The candidate suffix is a character or group of characters added.

Once the sentence tokenizer has the candidate suffix, the sentence tokenizer issues a next candidate utterance, illustrated as block 612. The next candidate utterance is an utterance that needs to be evaluated as expressions that generally indicate a pause during communications. The next candidate utterance may be generally formed by the sentence tokenizer in the form of: candidate start character+candidate vowel+candidate suffix+candidate end character. The sentence tokenizer then determines whether the next candidate utterance is a known word, illustrated as block 614. When the sentence tokenizer determines the next candidate utterance is a known word, the sentence tokenizer discards the next candidate utterance as a candidate utterance to look for while tokenizing sentences in natural language processing of phone calls, illustrated as block 616.

After the next candidate utterance is discarded or kept, the sentence tokenizer determines whether all suffixes have been inspected and used to generate candidate utterances, illustrated as block 620. When the sentence tokenizer determines all suffixes, in combination with the candidate start character, end character, and vowel, have not been inspected, the sentence tokenizer repeats blocks 610, 612, 614, 616, and 618 until all suffixes have been inspected with the candidate start character, end character, and vowel. Once the sentence tokenizer determines all suffixes have been inspected, the sentence tokenizer determines whether all possible candidate utterances have been inspected, illustrated as block 622. When the sentence tokenizer determines all of the possible candidate utterances have not been inspected, the sentence tokenizer repeats blocks 604-622 to generate and inspect additional possible candidate utterances until all possible candidate utterances have been generated and inspected. When the sentence tokenizer determines all candidate utterances have been inspected, the sentence tokenizer ends the method for generation of candidate utterances, illustrated as block 624.

Although aspects of the present disclosure are described with respect to embodiments in an organization call-in context, it should be appreciated that various disclosed techniques can be used in numerous other fields of technology which involve transcription of communications between parties. Various applications of the disclosed techniques provide substantial improvements to the functioning of the computer apparatus and the technical environments in which the various applications are implemented.

The improved systems and devices implementing a call tokenization engine improve the customer's experience in multiple areas by enabling fine grained data analysis at the sentence level by: determining the specific sentiment conveyed by the customer in each sentence, determining whether each sentence is relevant to an ongoing conversation, determining actions requested by the customer, and inferring intent from the spoken words. Representatives accessing the analysis data will be more able to more closely address a customer's needs using the transcriptions of communications. User experience is enhanced by an experience that is customized to the customer's needs based on analysis of the tokenized transcriptions.

In addition, the improved sentence tokenization engine and communication and audio file transcription systems and devices according to the disclosure provides opportunities to improve services to customers, opportunities for saving money, and opportunities that may better help address a customer's needs. Further, the improved sentence tokenization engine enables additional fine grained data analysis at the sentence level of conversations by more accurately determining the boundaries of sentences and producing higher quality transcribed telephone conversations.

Aspects of the present disclosure improve the particular technical environment for sentence tokenization technology by allowing more accurately determined sentence boundaries when there are no other indicators of the boundaries available. Aspects of the present disclosure improve the operation of certain customer interaction organizations, dashboards, machines, networks and/or systems. The call tokenization engine improves determination of the boundaries of sentences and produces higher quality transcribed telephone conversations with more accurate sentence tokenization, thereby improving the quality of customer care and experience, and reducing costs.

The detailed description of the present disclosure set forth herein makes reference to the accompanying drawings, which show various embodiments by way of illustration. While these embodiments are described in sufficient detail to enable those skilled in the art to practice the disclosure, it should be understood that other embodiments may be realized and that logical and physical changes may be made without departing form the spirit and scope of the disclosure. Thus, the detailed description herein is presented for purposes of illustration only and not limitation. For example, the steps recited in any of the method or process descriptions may be executed in an order other than as presented and are not limited to the order presented. Moreover, references to a singular embodiment may include plural embodiments, and references to more than one component may include a singular embodiment.

The present disclosure provides a system including components for extensive and specialized processes for transforming electronic, audio communication data, for example in the illustrative embodiment of healthcare data, into more accurately punctuated transcriptions of customer telephone calls, used to address a user's needs within a network of interconnected computing devices. Since healthcare data, which is highly sensitive and personal, may be involved in embodiments disclosed herein, one skilled in the art should appreciate that the data processing and intelligent routing of the present disclosure occur in a highly secure, networked computing environment. While the illustrative embodiments described herein may relate to healthcare information, it should be appreciated that secure systems as described may be implemented according to the disclosure for tokenization and transformation of other types of sensitive information such as financial information, legal information, national security information, or the like. The sophisticated, specialized, and specially configured networked computing environment and processes described herein facilitate determination of the boundaries of sentences and produce transcribed telephone conversations with more accurate sentence tokenization to assist in assessing meaning with greater clarity and/or addressing a caller's needs more accurately and/or quickly.

In various embodiments, software implementing functionality as described herein may be stored in a computer program product and/or loaded into a special purpose computer system using removable storage drive, hard disk drive or communications interface. Aspects of the disclosed process may be implemented in control logic or computer program instructions, which when executed causes the special purpose computer system to perform the functions of various embodiments as described herein. Implementation of the system including special purpose machines to perform the functions described herein will be apparent to persons skilled in the relevant art(s).

The systems, machines and processes described herein may be used in association with web services, utility computing, pervasive and individualized computing, security and identity systems and methods, autonomic computing, cloud computing, commodity computing, mobility and wireless systems and methods, open source, biometrics, grid computing and/or mesh computing.

Databases discussed herein are generally implemented on special purpose machines, systems and/or networks to ensure privacy of confidential information and data security is preserved in accordance with industry standards and government regulations. The databases may include relational, hierarchical, graphical, or object-oriented structure and/or other database configurations. Moreover, the databases may be organized in various manners, for example, as data tables or lookup tables. One skilled in the art will also appreciate that databases, systems, devices, servers or other components of the disclosed systems or machines may consist of any combination thereof at a single location or at multiple locations, wherein each database, system or machine may include of suitable security features, such as firewalls, access codes, encryption, decryption, compression, decompression, and/or the like. The special purpose systems, networks and/or computers discussed herein may provide a suitable website or other Internet-based graphical user interface which is accessible by users.

Functional blocks of the block diagrams and flowchart illustrations support combinations of means for performing the specified functions, combinations of steps for performing the specified functions, and program instruction means for performing the specified functions. It should be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Moreover, although the present disclosure has been described herein with reference to the accompanying drawings, it is to be understood that the present disclosure is not limited to those precise teachings, and that various other changes and modifications may be made by one skilled in the art without departing from the spirit and scope of the present disclosure.

What is claimed is:

1. A system for communication audio transcription sentence tokenization, comprising:
   an audio receiver receiving one or more audio files;
   a speech-to-text processing engine transcribing each of the one or more audio files to produce input transcriptions; and
   a call tokenization engine:
      storing one or more candidate expressions and expression pairs that are indicative of turn taking and change of context in phone conversations;
      receiving the input transcriptions of the one or more audio files from the speech-to-text processing engine;
      scanning each input transcription for the one or more candidate expressions and expression pairs;
      detecting a detected expression from the one or more candidate expressions and expression pairs;
      inserting a punctuation marker adjacent the detected expression in accordance with the detected expression when the detected expression is one of the one or more candidate expressions and expression pairs; and
      outputting a tokenized transcription when the call tokenization engine reaches an end of the input transcription.

2. The system of claim 1, wherein the audio receiver further receives at least one communication from a caller communication source and creates and stores audio files for the at least one communication.

3. The system of claim 1, wherein the call tokenization engine inserts the punctuation marker after the detected expression when the detected expression is a sentence-end candidate expression.

4. The system of claim 1, wherein the call tokenization engine inserts the punctuation marker before the detected expression when the detected expression is a sentence-start candidate expression.

5. The system of claim 1, wherein the call tokenization engine inserts the punctuation marker after the detected expression when the detected expression is an expression pair.

6. The system of claim 1, wherein the call tokenization engine inserts the punctuation marker after the detected expression when the detected expression is a non-word utterance.

7. The system of claim 1, wherein the call tokenization engine automatically generates non-word utterances as additional candidate expressions and expression pairs that are indicative of turn taking and change of context in communications.

8. A device for communication audio transcription sentence tokenization, comprising:
   a text processing engine receiving input transcriptions of electronic communication audio files; and
   a call tokenization engine:
      storing one or more candidate expressions and expression pairs that are indicative of turn taking and change of context in phone conversations;
      receiving the input transcriptions from the text processing engine;
      scanning one input transcription for the one or more candidate expressions and expression pairs;
      detecting a detected expression that is one of the one or more candidate expressions and expression pairs;
      inserting a punctuation marker adjacent the detected expression in accordance with the detected expression when the detected expression is a sentence-end candidate expression or a sentence-start candidate expression; and
      outputting a tokenized transcription when the call tokenization engine reaches an end of the input transcription.

9. The device of claim 8, wherein the call tokenization engine inserts the punctuation marker after the detected expression when the detected expression is the sentence-end candidate expression.

10. The device of claim 8, wherein the call tokenization engine inserts the punctuation marker before the detected expression when the detected expression is the sentence-start candidate expression.

11. The device of claim 8, wherein the call tokenization engine inserts the punctuation marker after the detected expression when the detected expression is an expression pair.

12. The device of claim 8, wherein the call tokenization engine inserts the punctuation marker after the detected expression when the detected expression is a non-word utterance.

13. The device of claim 8, wherein the call tokenization engine automatically generates non-word utterances as additional candidate expressions and expression pairs that are indicative of turn taking and change of context in communications.

14. A method for phone call audio sentence tokenization, comprising:
receiving one or more audio files;
transcribing each of the one or more audio files to produce input transcriptions;
storing one or more candidate expressions and expression pairs that are indicative of turn taking and change of context in phone conversations;
receiving the input transcriptions of the one or more audio files from the speech-to-text processing engine;
scanning each input transcription for the one or more candidate expressions and expression pairs;
detecting a detected expression from the one or more candidate expressions and expression pairs;
inserting a punctuation marker adjacent the detected expression in accordance with the detected expression when the detected expression is one of the one or more candidate expressions and expression pairs; and
outputting a tokenized transcription when the call tokenization engine reaches an end of the input transcription.

15. The method of claim 14, further comprising receiving at least one communication from a caller communication source and creates and stores audio files for the at least one communication.

16. The method of claim 14, wherein the inserting a punctuation marker adjacent the detected expression in accordance with the detected expression when the detected expression is one of the one or more candidate expressions and expression pairs comprises inserting the punctuation marker after the detected expression when the detected expression is a sentence-end candidate expression.

17. The method of claim 16, wherein the inserting a punctuation marker adjacent the detected expression in accordance with the detected expression when the detected expression is one of the one or more candidate expressions and expression pairs further comprises inserting the punctuation marker before the detected expression when the detected expression is a sentence-start candidate expression.

18. The method of claim 17, wherein the inserting a punctuation marker adjacent the detected expression in accordance with the detected expression when the detected expression is one of the one or more candidate expressions and expression pairs further comprises inserting the punctuation marker after the detected expression when the detected expression is an expression pair.

19. The method of claim 18, wherein the inserting a punctuation marker adjacent the detected expression in accordance with the detected expression when the detected expression is one of the one or more candidate expressions and expression pairs further comprises inserting the punctuation marker after the detected expression when the detected expression is a non-word utterance.

20. The method of claim 14, further comprising automatically generating non-word utterances as additional candidate expressions and expression pairs that are indicative of turn taking and change of context in communications.

\* \* \* \* \*